United States Patent
Moyer et al.

(10) Patent No.: US 8,054,655 B2
(45) Date of Patent: Nov. 8, 2011

(54) TAIL CURRENT CONTROL OF ISOLATED CONVERTER AND APPARATUS THEREOF

(75) Inventors: James C. Moyer, San Jose, CA (US); Kaiwei Yao, Santa Clara, CA (US); Yuxin Li, Stillwater, OK (US); Junming Zhang, Hanzhou (CN); Huanyu Lu, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 493 days.

(21) Appl. No.: 12/264,207

(22) Filed: Nov. 3, 2008

(65) Prior Publication Data

US 2010/0110732 A1 May 6, 2010

(51) Int. Cl.
*H02M 3/335* (2006.01)
(52) U.S. Cl. .................................. 363/21.13; 363/72
(58) Field of Classification Search ............... 363/16–20, 363/21.12–21.15, 41, 81, 89, 125, 127, 21.06, 363/21.13; 323/222, 282, 288
See application file for complete search history.

(56) References Cited

U.S. PATENT DOCUMENTS

| | | | | |
|---|---|---|---|---|
| 5,768,118 A | * | 6/1998 | Faulk et al. ........................ | 363/72 |
| 6,594,161 B2 | * | 7/2003 | Jansen et al. .................. | 363/21.14 |

* cited by examiner

*Primary Examiner* — Rajnikant Patel
(74) *Attorney, Agent, or Firm* — Perkins Coie LLP

(57) ABSTRACT

An inventive isolated converter which exempts the auxiliary isolation devices with accurate voltage regulation is disclosed. The converter includes the primary side circuit with a primary controller controlling the on and off of the primary switch and a secondary side circuit with a secondary controller controlling the on and off of the secondary synchronous rectifier. The isolated converter uses the secondary controller to turn on the secondary synchronous rectifier after the secondary current decreases to zero to generate a negative tail current and turns off the secondary synchronous rectifier at a reference tail current peak value to generate a reflected negative current at the primary side circuit for turning on the primary switch.

31 Claims, 9 Drawing Sheets

TAIL CURRENT CONTROL OF ISOLATED CONVERTER AND APPARATUS THEREOF

TECHNICAL FIELD

The present invention relates to converters, and more particularly, to the switching control of isolated converters.

BACKGROUND

Isolated converters are widely used in situations with high safety requirements and off-line power supply. A control is desired with high accuracy, high efficiency, low EMI, small size and low cost. Feedback control is essential to accurately adjust the energy delivered to the load. For isolated converters, a basic requirement of feedback is electrical isolation between the primary side and secondary side.

An optical coupler is commonly used in feedback control to achieve electrical isolation. The output voltage information at the secondary side is fed back to the primary side through the optical coupler to accurately control the primary side switch delivering the optimal energy to the secondary side. One drawback of employing an optical coupler is that it increases the system cost. Further, an optical coupler can be damaged under high isolation voltages. For example, in medical instrumentation applications, power supply systems require high reliability and often suffer from high voltage spikes.

Another isolated feedback approach uses a dedicated third winding or auxiliary winding. The output voltage at the secondary side is similar to that in the auxiliary winding. Thus, by detecting the voltage at the auxiliary winding side, feedback information can be obtained. However, there exist problems while adopting the feedback approach. One problem is that it can not accurately reflect the output level, especially during a load transient. Like the optical coupler, the auxiliary winding approach increases cost. Thus, it is a challenge to realize the voltage feedback control accurately in a simple way.

Besides cost and accuracy considerations, high efficiency and low EMI are also desired. One approach is using soft switching technology such as ZVS (zero voltage switching) to reduce the switching loss. For ZVS, the drain-source voltage of the switch is zero when the switch is turned on so that there is no turn-on loss. Also, a snubber capacitor can be paralleled directly with the power MOSFET. The dv/dt is greatly reduced, which not only lowers the turn-off loss, but also reduces EMI significantly. With the reduction of the switching loss, the converter can run at higher switching frequency, which reduces the sizes of transformer and other passive components.

The quasi-resonant converter is a typical isolated converter with soft switching and feedback control. FIG. 1 shows a prior art topology of a quasi-resonant converter wherein Lp is the inductance of the primary winding, Rp is the resistance of the primary winding, Cp is the resonant capacitor, and Ld is the inductance of the auxiliary winding. When the energy at the secondary side depletes (magnetic flux resetting), there is an oscillating voltage at the drain of the primary switch Qp. The resonant frequency is determined by Lp and Cp, and the attenuation factor is decided by Rp. An auxiliary winding Ld is employed to detect the magnetic flux resetting and thus control Qp turn-on at the bottom of the oscillating voltage to decrease the switching loss. Meanwhile, an optical coupler is used to feedback the output voltage information to the primary side to regulate the energy delivered to the secondary side. As described above, the quasi-resonant converter adopts both the auxiliary winding and an optical coupler to realize feedback and soft switching. However, it can not ensure a zero voltage switching and it has large size and high cost.

SUMMARY

The present disclosure provides one type of isolated converters used in DC-DC converters or AC-DC converters wherein the auxiliary isolation device used for feedback such as optical coupler or auxiliary winding is exempted while realizing isolated feedback and accurate voltage regulation. At the primary side circuit of the isolated converter, a primary controller controls the on and off of the primary switch. At the secondary side circuit, a secondary controller controls the on and off of the secondary synchronous rectifier. The secondary controller turns on the secondary synchronous rectifier after the secondary current decreases to zero to generate a negative tail current and turns off the secondary synchronous rectifier at a reference tail current peak value to generate a reflected negative current at the primary side circuit for turning on the primary switch. The control method includes: turning off the primary switch when the primary current reaches a reference primary current peak value, and meanwhile, at the secondary side, generating a positive current and turning on the secondary synchronous rectifier. After the secondary current decreases to zero, the secondary synchronous rectifier is kept turned on to generate a negative tail current at the secondary side. The secondary synchronous rectifier is turned off when the tail current reaches the tail current peak value. At the same time, the primary side circuit generates a negative current which discharges the drain voltage of primary switch through the capacitor connected in parallel with the primary switch to zero or near zero and turning off the primary switch. In this way, the primary switch is turned on shortly after the secondary current decreases to zero and realized near critical switching control, and the primary switch fulfills zero voltage switching during turn-on.

In one embodiment, in order to improve efficiency in consideration of input voltage variation, the tail current peak value feeds forward the input current through the peak value of the source-drain voltage of said secondary synchronous rectifier. Since the peak value of the source-drain voltage of said secondary synchronous rectifier is proportional to the input voltage, when the input voltage decreases, the tail current peak value decreases accordingly, thus the reflected primary peak current decreases to lower the circulation current conduction loss while maintaining enough energy to discharge the drain voltage of the primary switch to zero.

Further, the output accuracy is improved while applying the tail current control method as described above. One approach is to feedback the load information by the tail current peak value to the primary side. The tail current peak value changes according to the output voltage or output current, for example, when the output current increases or the output voltage decreases during load step-up, the tail current peak value increases. This information is detected from the reflected primary peak current and increases the positive primary current peak value accordingly to adjust the output voltage. Another approach is to regulate the output voltage combined with the bang-bang control method wherein when the secondary controller detects that the output voltage is larger than an upper threshold, the secondary synchronous rectifier is turned off until the output voltage is lower than a lower threshold.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. For example, in FIG. 5, the circuit applies one type of RS flip-latch. It should be known that other types of RS flip-latches can be used to fulfill the same functions. Furthermore, in the following detailed description of the present invention, numerous specific details are set forth in order to provide a thorough understanding of the present invention. However, one of ordinary skill in the art will realize that the present invention may be practiced without these specific details. In other instances, well-known methods, procedures, components, and circuits have not been described in detail so as not to unnecessarily obscure aspects of the present invention.

The control method, the primary controller and the secondary controller of the present invention can be applied in any DC-DC isolated converters or AC-DC isolated converters. In the following description, in the interest of brevity, only a flyback DC-DC converter is used as an example to explain the detailed operation of the invention.

Figure 1:
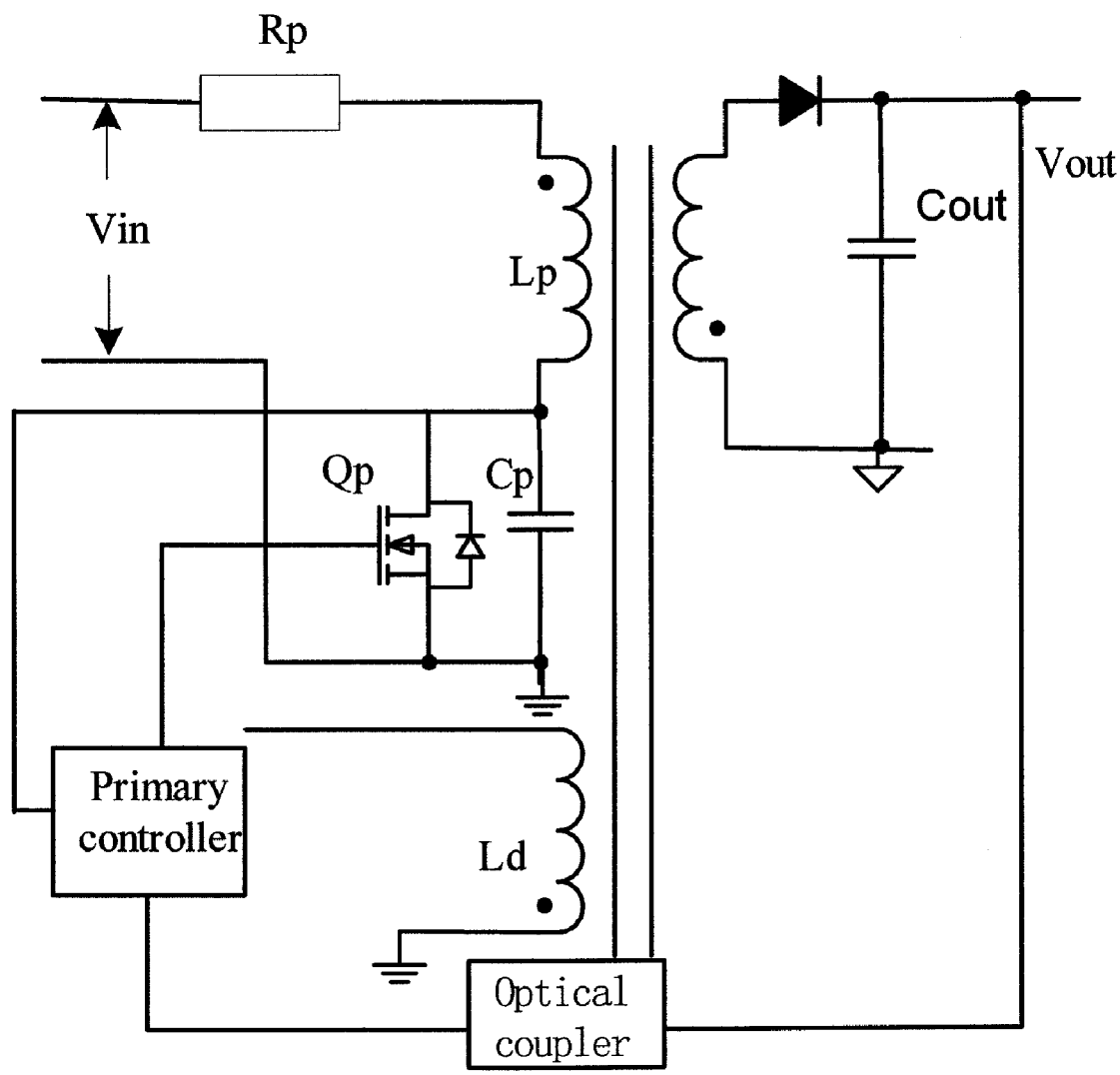
FIG. 1 shows a topology of a quasi-resonant converter as a prior art.
Figure 2:
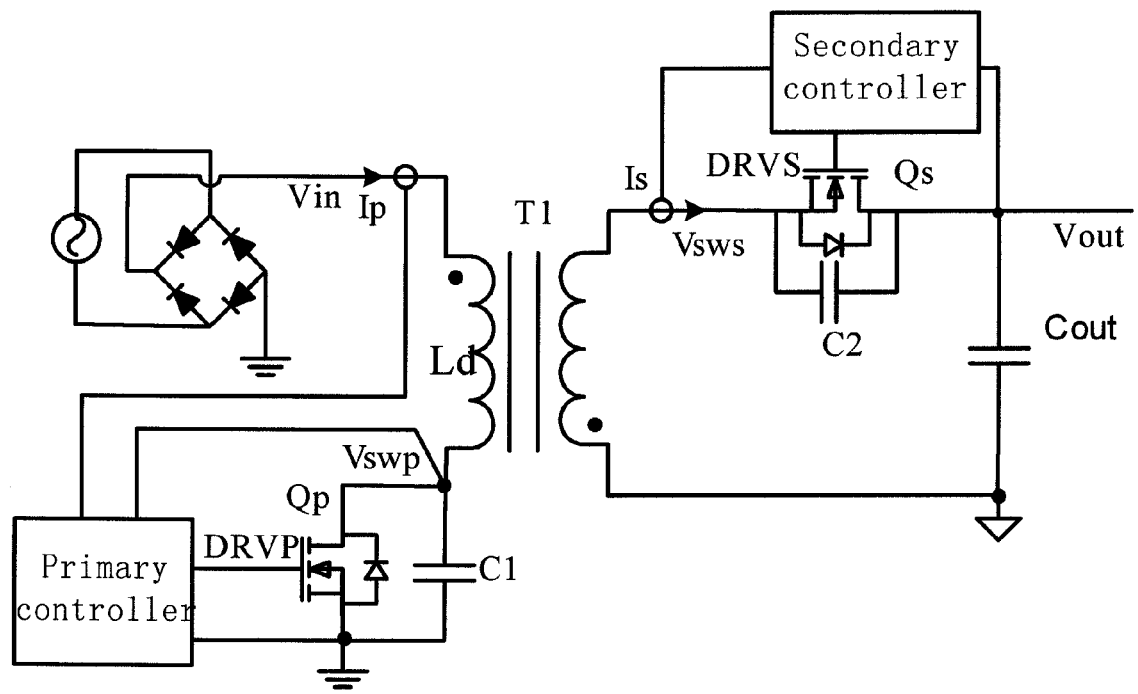
FIG. 2 shows a schematic diagram of a flyback converter in accordance with an embodiment of the present invention.

Referring to FIG. 2, a schematic diagram of a DC-DC flyback converter in accordance with an embodiment of the present invention is shown. As shown in FIG. 2, the converter includes the primary side circuit and the secondary side circuit isolated by transformer T1. The primary side circuit includes a DC input Vin, a primary winding, a primary switch Qp, a capacitor C1 and a primary controller. Qp is turned on and off periodically. The primary controller receives the drain voltage of Qp (Vswp), the source voltage of Qp, and the primary current Ip directly or indirectly to produce a primary gate control signal DRVP to control the on and off of Qp. The secondary side circuit includes a secondary winding, a secondary synchronous rectifier Qs, a filtering capacitor Cout and a secondary controller. Qs is used to rectify the signal generated by the secondary winding, and the rectified signal is filtered by Cout to get Vout which is supplied to the load. The secondary controller receives the source voltage of Qs (Vsws), the output voltage Vout, and the secondary current Is to produce a secondary gate control signal DRVS to control the on and off of Qs.

The secondary controller keeps Qs on for a short period after the secondary current (Is) decreases to zero. As a result, Qs is turned off with a small negative tail current (flowing from the drain to the source of Qs) at a tail current peak value. Such tail current will be reflected to the primary side, discharging Vswp through capacitor. C1 to zero. The primary controller then turns on Qp with ZVS when zero Vswp is detected. Such control as described above is referred to herein as tail current control.

In one embodiment, the secondary controller adaptively controls the tail current peak value according to Vin. Since the peak value of Vsws is proportional to Vin, this feed forward control is achieved by controlling the tail current peak value according to the peak value of Vsws. In some other embodiments, the tail current peak value feedbacks the load information to the primary side, and the primary side circuit gets the information by detecting the primary side reflected value. Thus, the signal on the secondary side is fedback to the primary side without requiring an auxiliary winding or optical coupler. Besides the ZVS function, capacitor C1 also functions as a turn-off snubber for Qp. Also for the secondary side circuit, in one embodiment, a capacitor C2 is connected in parallel with Qs to function as a turn-off snubber.

Note that the switches used to implement Qp and Qs can be MOSFET, IGBT and any other desired type of switch.

Figure 3:
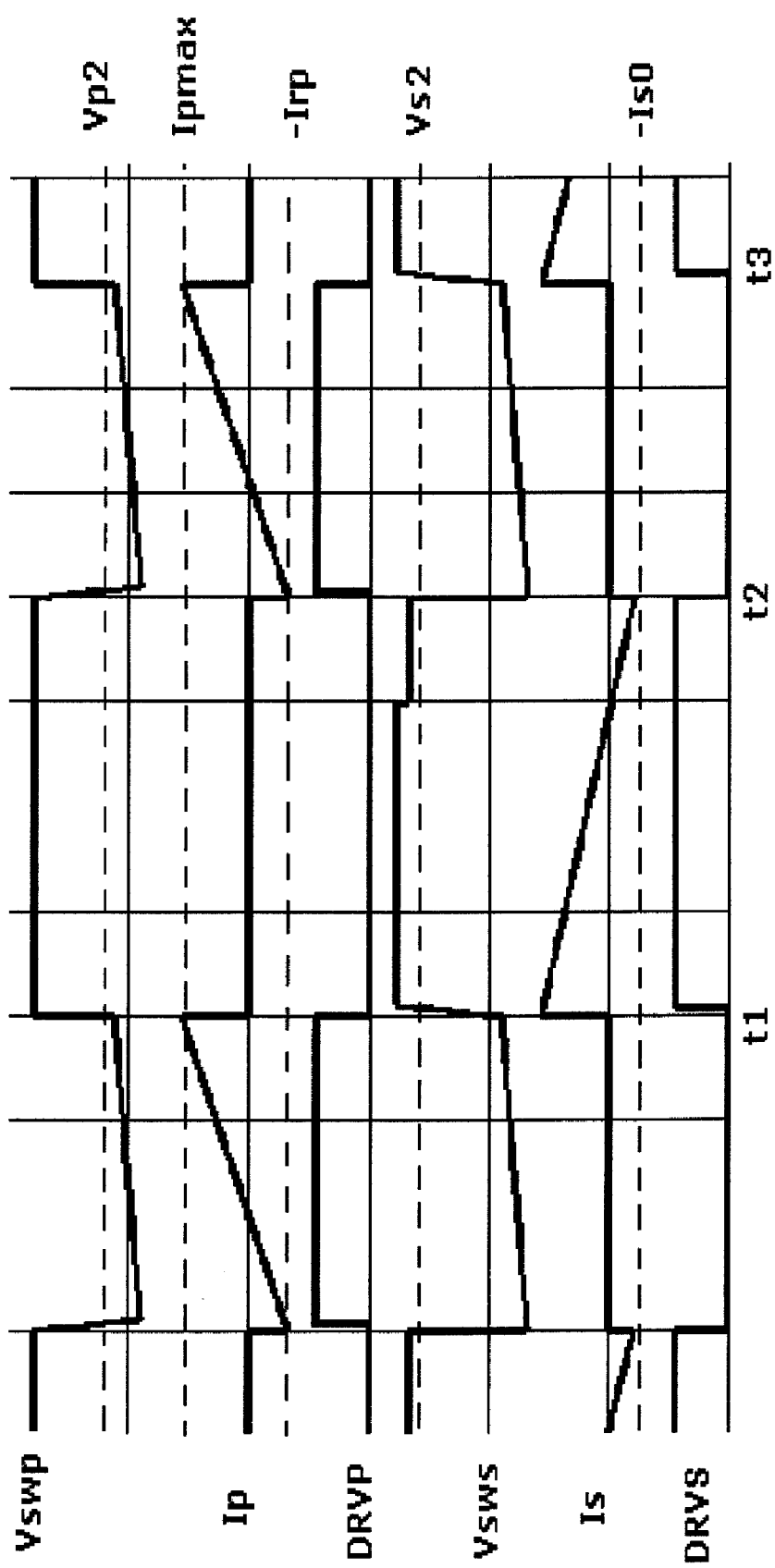
FIG. 3 is a timing diagram showing the function of the tail current control of the present invention.

Referring to FIG. 3, the timing diagram of the isolated converter shown in FIG. 2 with tail current control in accordance with an embodiment of the present invention is illustrated. In FIG. 3, the signals Vswp, Ip, DRVP, Vsws, Is, DRVS are shown. At time t1, Ip increases to the level of Ipmax, thus DRVP is reset to be low to turn off Qp, wherein Ipmax is a reference primary current peak value. This primary current is reflected to the secondary side circuit, and a positive secondary current Is flows from the bottom to the top of the secondary winding and flows through the body diode of Qs. The secondary side circuit detects this positive Is and sets DRVS high to turn on Qs. The positive current causes Vsd of Qs become high. If Qs is a low side switch, this turn-on control can also be adopted when the drain voltage of Qs is lowered below a predetermined negative value. If Qs is a high side switch as shown in FIG. 2 and FIG. 3, this turn-on control can also be adopted when Vsws is higher than a predetermined secondary turn-on trigger voltage Vs2. Thereafter, Is decreases gradually until it reaches zero.

After Is reaches zero, the secondary controller maintains DRVS high, and generates a negative tail current at the secondary side. At time t2, the tail current reaches the tail current peak value Is0 and sets DRVS low to turn off Qs. At the same time, a reflected negative current generates at the primary side circuit with a peak value of Irp, discharging Vswp through C1. When Vswp is discharged to zero, this sets DRVP high and turns on Qp. In practical operation, Vp2 at a value equaling or approximating to zero is used as the primary turn-on trigger voltage. When Vswp decreases to the level of Vp2, this sets DRVP high and turns on Qp. Thereafter, Ip increases and at t3 reaches Ipmax as described at t1. As described in the previous paragraph, in one embodiment, the tail current peak value feeds forward the input voltage Vin by Vsws. When Vin increases, the energy needed to discharge Vswp to zero also increases. Meanwhile, the peak value of Vsws increases with Vin, by detecting Vsws, the secondary controller increases the tail current peak value Is0 according to the peak value of Vsws. Thus, the reflected primary peak current Irp increases since Irp is proportional to Iso, to make sure there is more energy to discharge Vswp to zero.

Whereas, when Vin decreases, Irp decreases accordingly, the conduction loss of Qp reduces. Thus, Iso changes with Vsws in the same direction. This adaptive control makes sure the reflected current at the primary side is large enough to discharge C1, but relative small to maintain low conduction loss of Qp.

In another embodiment, in order to regulate Vout precisely, feedback control is implemented without an auxiliary isolation device and with a simple control combined with the tail current control. The control is achieved that the tail current peak value is regulated by Vout or output current. When Vout decreases or the output current increases during load step up, the secondary controller detects this and increases Is0 accordingly. By detecting Irp at the primary side, the primary controller increase Ipmax accordingly to regulate Vout. During load step down, Ipmax decreases according to the decrease of Irp. In other words, Ipmax changes with Irp in the same direction.

Figure 4:
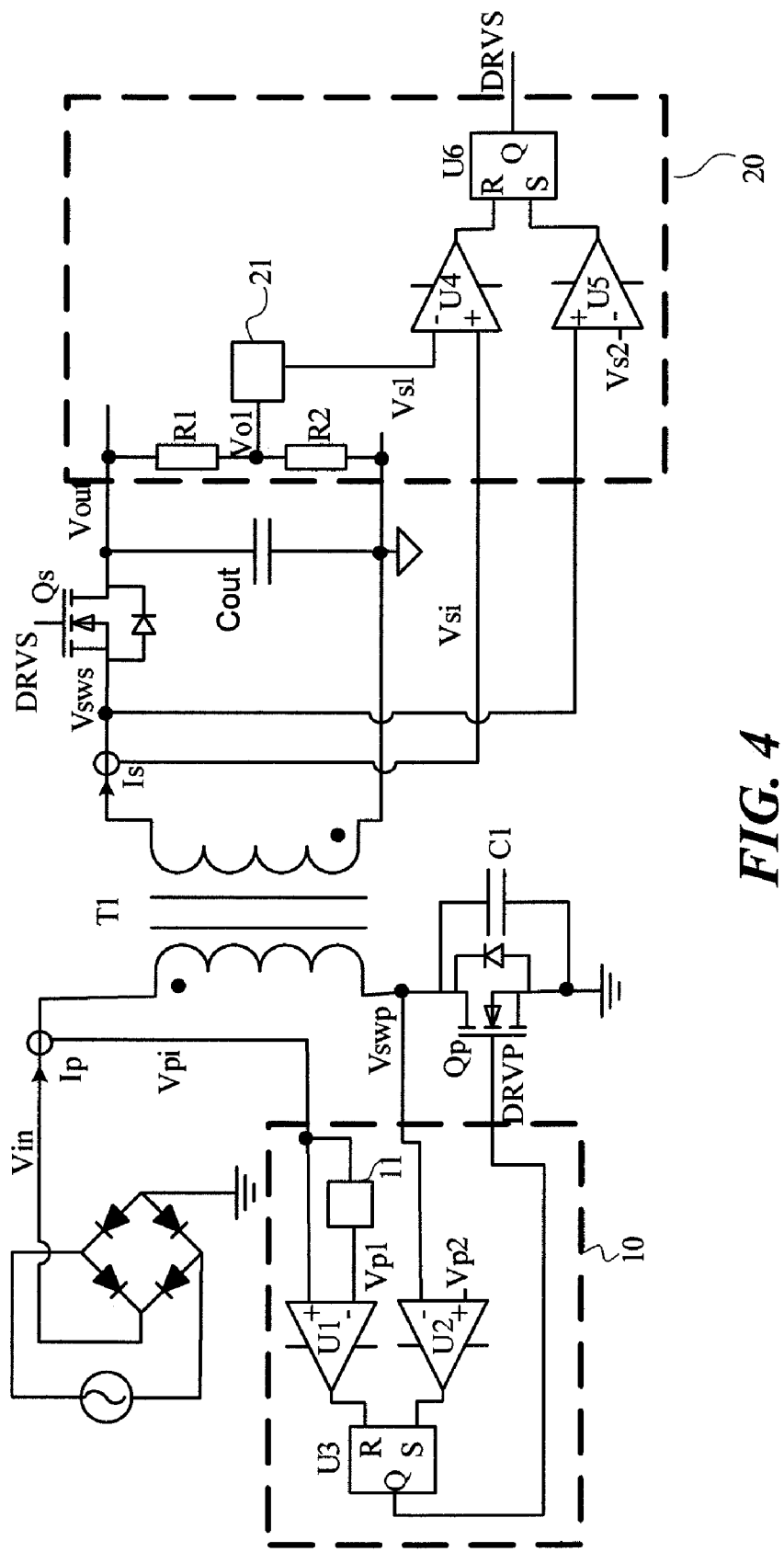
FIG. 4 shows a circuit with feedback control in accordance with one embodiment of the present invention.

FIG. 4 shows the circuit diagram for realizing the feedback control. As shown, the circuit shows a flyback converter comprised of a transformer T1, a discharging capacitor C1, a primary side switch Qp, a primary controller 10, a secondary synchronous rectifier Qs, a filter capacitor Cout and a secondary controller 20. The primary controller 10 includes a first comparator U1, a second comparator U2, an Ipmax reference voltage generator 11 and a flip-latch U3. The Ipmax reference voltage generator 11 receives the reflected primary peak current Irp and generates a reference voltage Vp1 according to Irp in the same direction. U1 has its inverting input connected to the output of the reference voltage generator 11 and receives the voltage Vpi at its non-inverting input wherein Vpi is a sensed value of Ip. The proportion of Vp1 to Ipmax equals that of Vpi to Ip. U2 receives Vswp signal at its inverting input and receives a reference voltage Vp2 at its non-inverting input wherein Vp2 is the primary turn-on trigger point. The output of U1 is connected to the reset input (R) of U3. The output of U2 is connected to the set input (S) of U3. The output of U3 is coupled to the gate of Qp. U3 outputs the DRVP signal. When Irp increases, Vp1 increases.

The secondary controller 20 includes a first comparator U4, a second comparator U5, a tail current peak value reference voltage generator 21 and a flip-latch U6. The tail current peak value reference voltage generator 21 receives the output voltage or the output current to generate the reference voltage Vs1 representing Is0. Vs1 varies inversely to Vout or varies in the same direction to the output current. U4 receives the reference voltage Vs1 at its inverting input and receives voltage Vsi representing reverse current of Is at its non-inverting input. The proportion of Vs1 to Iso equals that of Vsi to −Is. U5 receives Vsws at its non-inverting input and receives reference voltage Vs2 at its inverting input. The output of U4 is connected to the reset input (R) of U6 and the output of U5 is connected to the set input (S) of U6. The output of U6 is coupled to the gate of Qs. U6 puts out the DRVS signal to drive Qs. The secondary controller 20 can further include the secondary synchronous rectifier.

Figure 5:
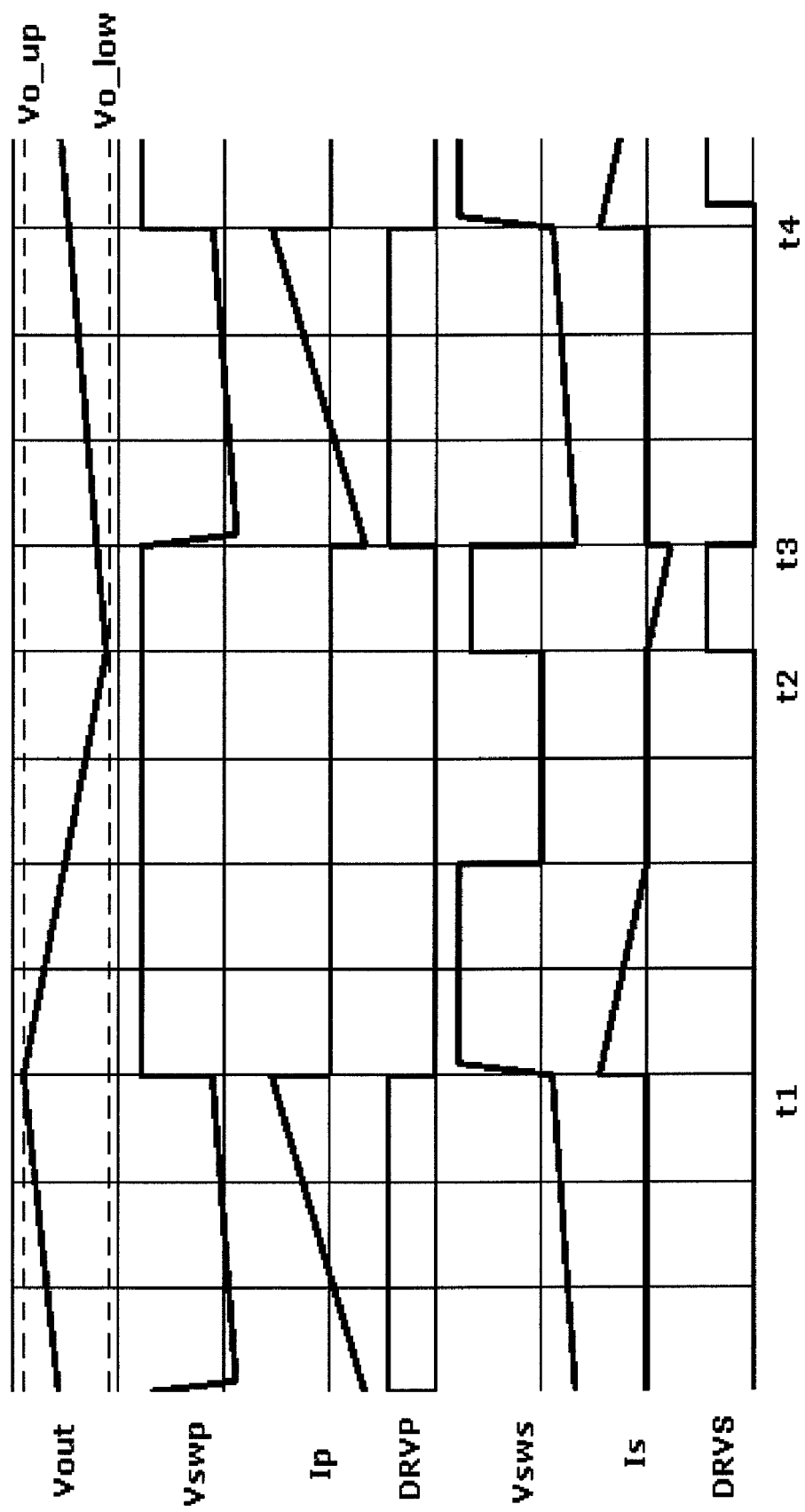
FIG. 5 is a timing diagram showing the function of bang-bang control combined with the tail current control for another embodiment of the present invention.

FIG. 5 is a timing diagram in accordance with another embodiment applying bang-bang control combined with the tail current control as described in FIG. 3 to regulate the output. The bang-bang control confines the output voltage between an upper threshold Vo_up and a lower threshold Vo_low. Assume first that Qp and Qs works as described in FIG. 3, Vout is between the thresholds of Vo_up and Vo_low. Once Vout is larger than Vo_up, the switching activity of Qs and Qp pauses until Vout drops below Vo_low. Now the control method will be described with timing diagram in FIG. 5. The signals shown sequentially are Vout, Vswp, Ip, DRVP, Vsws, Is and DRVS. At time t1, the primary controller detects Ip>Ipmax. Accordingly, it sets DRVP low to turn off Qp which causes a positive current flowing at the secondary side and causes Vsws to go high. At that time, though Vsws>Vs2, Vout>Vo_up also appears, the later one has higher priority, and DRVS maintains low. DRVS keeps low until Vout<Vo_low. At time t2, Vout reaches Vo_low, the secondary controller turns on Qs again. At that time, a negative tail current is generated, flowing from the drain to the source of Qs. The control goes back to normal tail current control as described in FIG. 3.

At time t3, the negative tail current reaches tail current peak value Is0, and the secondary controller set DRVS low to turn off Qs which generates a reflected negative current at the primary side circuit and discharges Vswp through C1 to below Vp2 to turn on Qp. Vp2 equals or is near zero. With the bang-bang control, during light load condition, the time of keeping the switches off from the Vout above Vo_up to below Vo_low becomes longer, which reduces the switching loss of the converter and improves efficiency.

Figure 6:
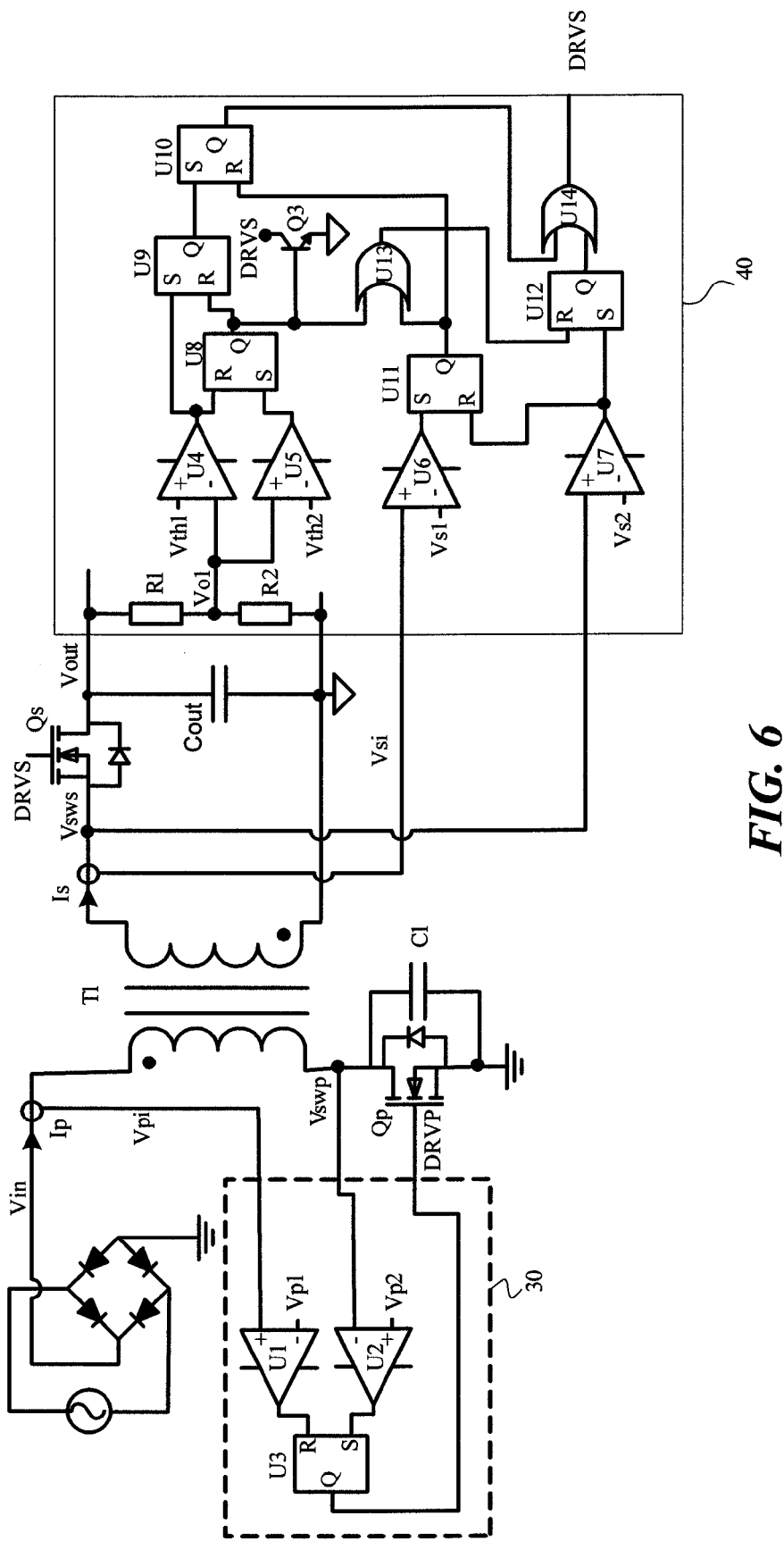
FIG. 6 shows a circuit diagram in accordance with the present invention as shown in FIG. 5.

Now referring to FIG. 6, a circuit diagram for the bang-bang control combined with tail current control in accordance with the timing diagram in FIG. 5 is illustrated. The function of the primary controller 30 and secondary controller 40 will be described in detail as follows.

The primary controller 30 includes a comparator U1, a comparator U2 and an RS flip-latch U3. U1 receives the voltage signal Vpi proportional to Ip at its non-inverting input and receives a reference signal Vp1 at its inverting input. The output of U1 is connected to the reset input (R) of RS flip-latch U3. The proportion of Vpi to Ip equals that of Vp1 to Ipmax. Comparator U2 receives Vp2 at its non-inverting input and receives Vswp at its inverting input. The output of U2 is connected to the set input (S) of RS flip-latch U3. The output of U3 is coupled to the gate of Qp. U3 puts out the DRVP signal to control Qp. When Ip>Ipmax, which leads to Vpi>Vp1, U1 puts out a logical "1" and U3 is reset to put out a logical "0" DRVP signal to turn off Qp. When the tail current reaches Is0 as shown in FIG. 3 and turns off Qs, a maximum negative current Ipr generates at the primary side, and Ipr=n1/n2.Is0, wherein n1 is the winding number of the primary side, and n2 is the winding number of the secondary side. This negative current discharges Vswp through C1 to cause Vswp<Vp2. U2 puts out a logical "1" to set DRVP high. Wherein Vp2 equals or approximates to zero voltage. Thus, Qp is turned on with zero voltage. C1 realized ZVS function for Qp. The selection of C1 satisfies $$\frac{n_1}{n_2} * I_{s0} = \frac{Vin + \frac{n_2}{n_1} * Vout * \cos\left(\omega * \frac{T}{4}\right)}{Z * \sin\left(\omega * \frac{T}{4}\right)} \text{ wherein}$$

$$\omega = \frac{1}{\sqrt{Lp * Cp}} \quad T = 2\pi * \sqrt{Lp * Cp} \quad Z = \sqrt{\frac{Lp}{Cp}},$$

and Cp is comprised of C1 and the parasite capacitor of Qp connected in parallel and Lp is the inductor of the primary winding. When Qp is turned off upon Ip reaching Ipmax, C1 acts as a turn-off snubber.

It should be noted that the primary controller 10 and 30 can have other equivalent embodiments to achieve the same control. For example, the primary controller 10 and 30 further includes a drain-source voltage (Vswp) detection circuit, primary current (Ip) detection circuit, reference voltage generators for Vp1 and Vp2 and gate driving circuit. The gate driving circuit has its input connected to the output of U3 and its output connected to the gate of Qp. The primary controller 10 and 30 can use other types of RS flip-latch.

The secondary controller 40 controls the on and off of Qs and it includes a first comparator U4, a second comparator U5, a third comparator U6, a fourth comparator U7, a first RS flip-latch U8, a second RS flip-latch U9, a third RS flip-latch U10, a fourth RS flip-latch U11, a fifth RS flip-latch U12, a first OR gate U13, a second OR gate U14 and an output voltage detection circuit comprised of resistors R1 and R2. Comparator U4 receives the Vo1 signal at its inverting input and the lower threshold reference voltage Vth1 at its non-inverting input and has its output connected to the reset input (R) of U8 and the set input (S) of U9. Vo1 is proportional to Vout from the voltage divider of R1 and R2.

Comparator U5 receives Vo1 at its non-inverting input and the upper threshold reference voltage Vth2 at its inverting input and has its output connected to the set input (S) of U8. Vth1 represents the lower threshold Vo_low and Vth2 represents the upper threshold Vo_up. The proportion of Vth1 to Vo_low and Vth2 to Vo_up equals that of Vout to Vo1. Comparator U6 receives Vsi proportional to secondary negative current at its non-inverting input and a reference voltage Vs1 at its inverting input and has its output connected to the set input (S) of U11. When Is flows from the drain to source of Qs as a negative current, Vsi is a positive value. The proportion of Vsi to the absolute value of Is is the same as that of Vs1 to Is0.

Comparator U7 receives Vsws at its non-inverting input and Vs2 at its inverting input and has its output connected to the reset input (R) of U11 and the set input (S) of U12. RS flip-latch U8 has its output connected to the reset input (R) of U9 and one input of OR gate U13. RS flip-latch U9 has its output connected to the set input (S) of U10. The output of U10 is connected to one input of U14. The output of U11 is connected to another input of U13 and the reset input (R) of U10. The output of U13 is connected to the reset input (R) of RS flip-latch U12. The output of U12 is connected to another input of U14. The outputs of OR gate U14 is coupled to the gate of Qs. U14 puts out the DRVS signal to control the on and off of Qs. When Qp is turned off, the secondary side generates positive current and steps up Vsws. When Vsws>Vs2 is detected, comparator U7 puts out a logical "1" and sets RS flip-latch U12 high which turn on Qs. Is decreases to zero gradually and then to a negative tail current. When the tail current surpasses the tail current peak value Is0, that is Vsi>Vs1, comparator U6 puts out a logical "1" to set U11 high and reset U10 low. At the same time, the OR gate U13 provides a logical "1" to reset U12 low, thus the OR gate U14 delivers a low level DRVS to turn off Qs. At the turning off point of Qs, Vswp is discharged through C1 to zero and turns on Qp again.

The bang-bang control will be described with reference to FIG. 6. When Vout increases and achieves Vout>Vo_up or Vo1>Vth2, comparator U5 provides a logical "1" to set U8 and U13 high, then U9 and U12 is set low, while U10 maintains logical "0", U14 puts out low level DRVS and turns off Qs. When Qs is turned off at zero secondary current, the voltage oscillation will be generated by the leakage inductor of secondary winding and the parasite capacitor of Qs and causes Vsws reach the secondary turn-on trigger voltage Vs2 and turns on Qs by mistake. In order to eliminate this error triggering, a transistor Q3 is added. Here we use a NPN transistor with the base node connected to the output of U8, the emitter node connected to the ground and the collector node connected to the DRVS terminal. When Vo1>Vth2, Q3 is activated, DRVS is pulled to low voltage directly to make sure Qs is under off state. As there is no tail current generated when Qs is turned off at Vout>Vth2, Qp keeps off too. Qp and Qs keeps off until Vo1<Vth1, which sets U9 high and DRVS is set high to turn on Qs. The control goes into the steady state mode of tail current control.

The secondary controller 20 and 40 further can have other equivalents to fulfill the same function. For example, an error amplifier may be used to replace the output voltage detection circuit comprised of R1 and R2, and, the outputted error signal is used to compare with the upper and lower thresholds for bang-bang control. The secondary controller 20 and 40 further includes one or more devices such as the output current detection circuit, secondary current detection circuit, drain voltage detection circuit, reference voltage generators or gate driving circuit. The secondary controller 20 and 40 may include the secondary synchronous rectifier.

As described above, one advantage of using the tail current control in the present invention is that when the secondary synchronous rectifier turns off, with the tail current, the reflected negative current at the primary side can pull down the Vds of the primary switch to zero and achieves ZVS, thus to lower down the EMI and switching loss. Yet in another embodiment, the feedback is realized without an optical coupler or auxiliary winding by modulating the tail current peak value according to the load information at the secondary side. The load information at the secondary side can be reflected back to and detected at the primary side to achieve higher efficiency and higher output accuracy.

Figure 7:
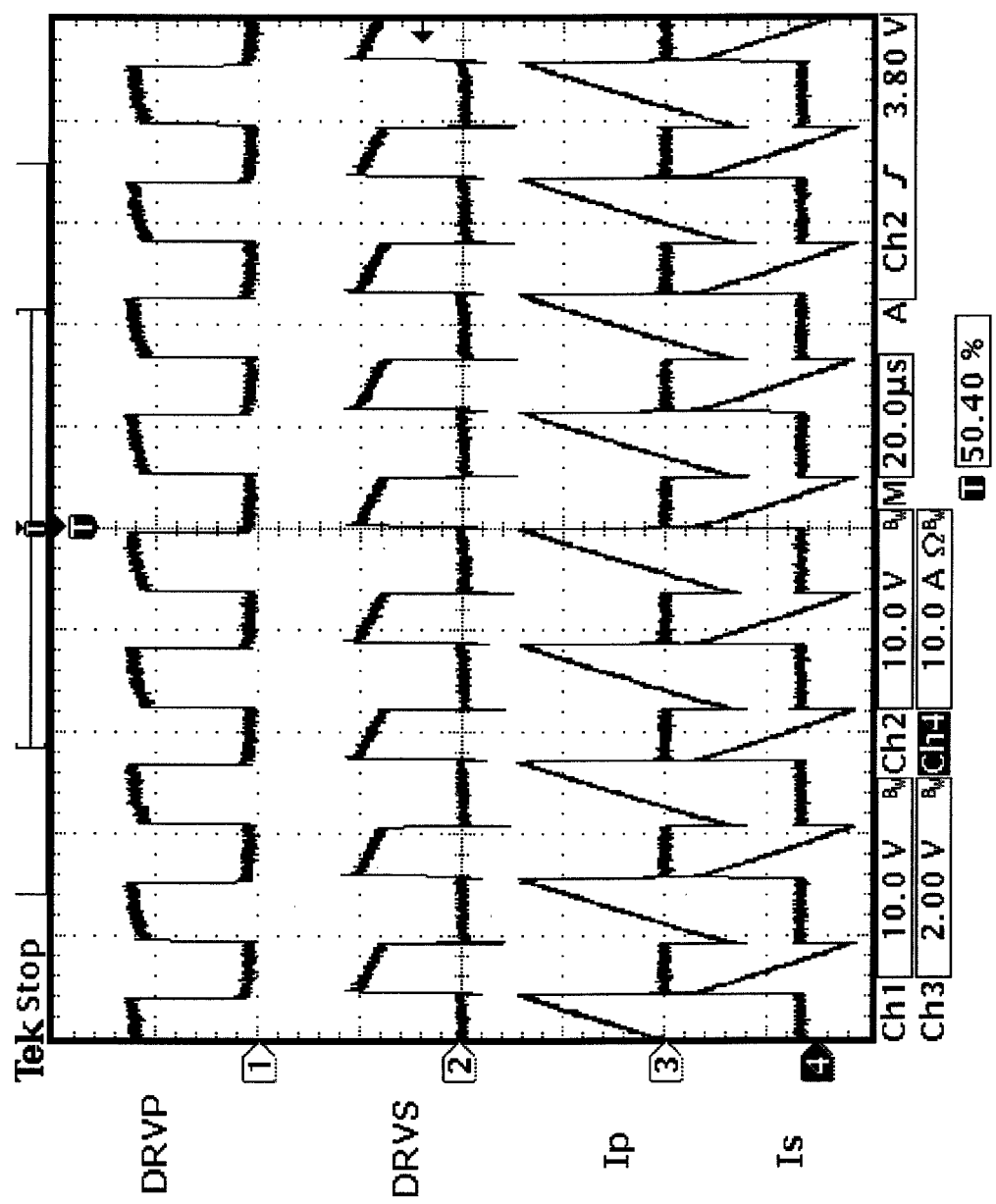
FIG. 7 is a timing diagram showing various signals present in the circuit of FIG. 6 over time in accordance with the tail current control.
Figure 8A:
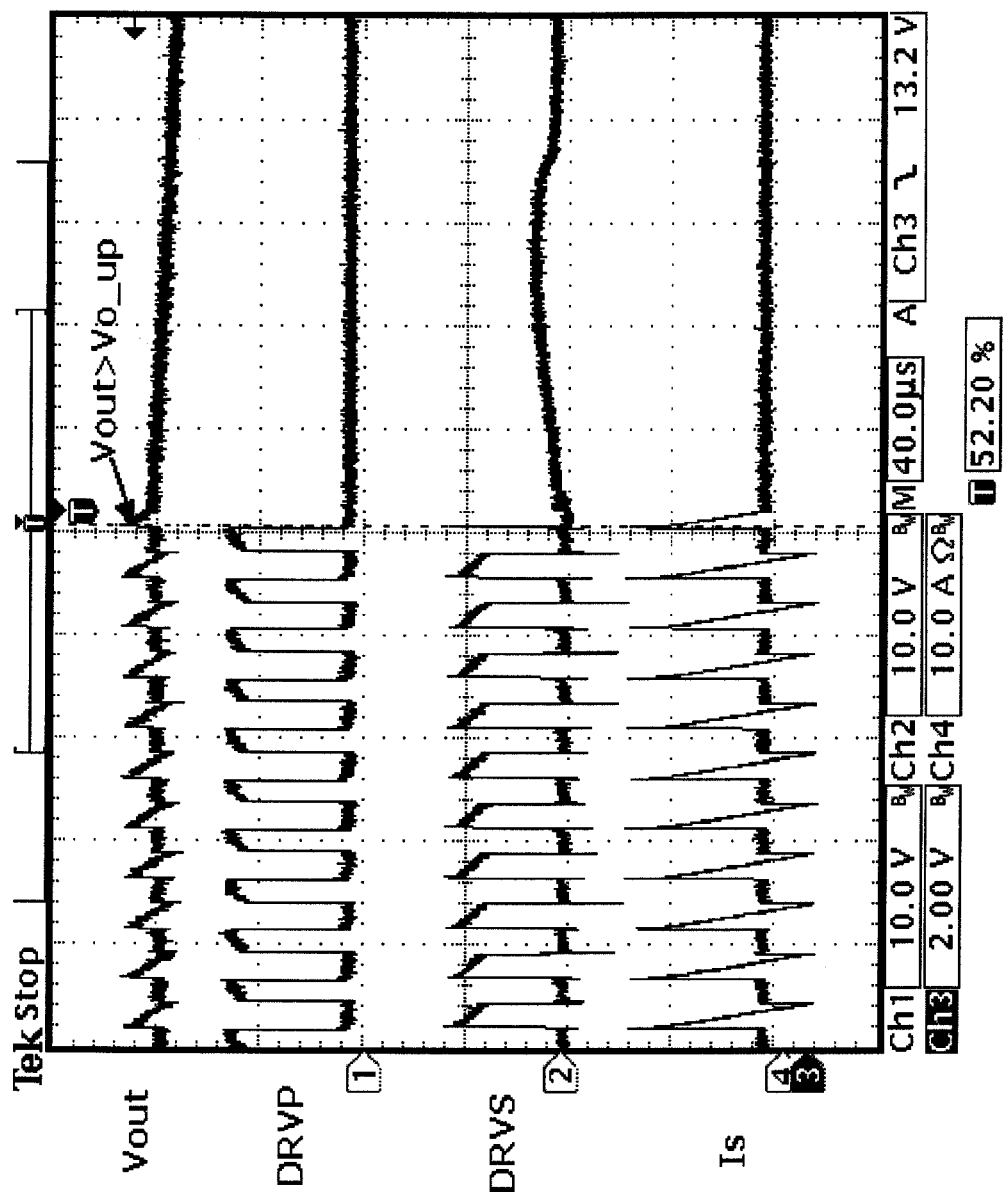
FIGS. 8A and 8B are timing diagrams showing the various signals present in the circuit of FIG. 6 over a period of time with bang-bang control.
Figure 8B:
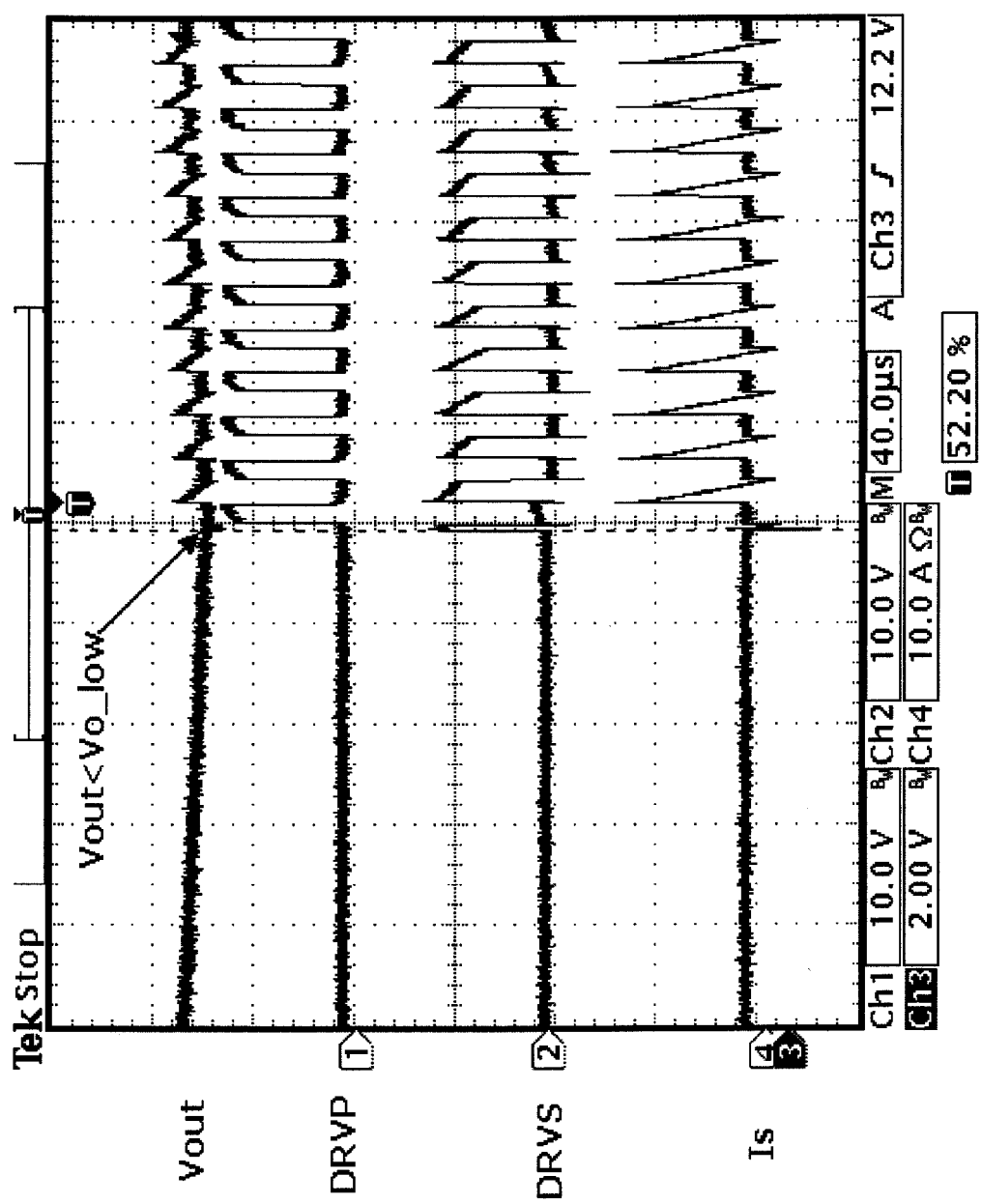

FIG. 7, FIG. 8A and FIG. 8B show the waveforms of signals tested from the circuit according to FIG. 6. FIG. 7 shows the signals of DRVP, DRVS, Ip and Is sequentially as in the steady state mode. The parameters are set respectively: Vin=60V, Vout=12V and Iout=1A. From FIG. 7, we can see that the secondary synchronous rectifier is turned off at a negative tail current peak value and meanwhile a negative current is generated at the primary side. This primary negative current draws Vswp low and DRVP is set high to turn on the primary switch. When Ip increases to a reference primary peak value, DRVP is set to logical "0".

FIG. 8A shows the waveform with bang-bang control in a longer time comparing with in FIG. 7. FIG. 8A also uses the parameters of Vin=60V, Vout=12V and Iout=1A. At the center of the figure (as shown in dotted line), Vout>Vo_up occurs and DRVS is set low. The residual positive secondary current flows through the body diode of the secondary synchronous rectifier and decreases to zero gradually. DRVP and DRVS keeps low until Vout<Vo_low as shown in FIG. 8B in the center (as shown in dotted line). When Vout<Vo_low occurs, DRVS is set high immediately and the negative tail current generates which comes into the steady state mode.

The tail current control method combined with bang-bang control can automatically adjust the output voltage and also the frequency. During heavy load conditions, the pause duration of the primary switch and secondary synchronous rectifier (as shown with blank line in FIG. 8A and FIG. 8B) turns shorter than in lighter load conditions, thus automatically is efficient with less switching loss during light load condition.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An isolated voltage converter for supplying a load, comprising:
   a primary side circuit, including a primary switch and a primary controller;
   a secondary side circuit, including a secondary synchronous rectifier and a secondary controller, wherein said secondary controller controls said secondary synchronous rectifier to generate a negative tail current and turns off said secondary synchronous rectifier at a reference tail current peak value to generate a reflected negative current at the primary side circuit to control said primary switch, wherein said secondary controller increases said tail current peak value when the load increases and wherein said secondary controller decreases said tail current peak value when the load decreases.

2. The isolated voltage converter in claim 1, wherein said primary switch is connected in parallel with a capacitor and said primary controller turns on said primary switch when the drain voltage of said primary switch decreases to a reference primary turn-on trigger voltage.

3. The isolated voltage converter in claim 2, wherein said reference primary turn-on trigger voltage is near zero voltage.

4. The isolated voltage converter in claim 2, wherein said primary controller turns off said primary switch when the primary current increases to a reference primary current peak value.

5. The isolated voltage converter in claim 1, wherein said secondary controller turns on said secondary synchronous rectifier when the secondary current increases to a predetermined value.

6. The isolated voltage converter in claim 1, wherein said secondary controller turns on said secondary synchronous rectifier when the source-drain voltage of said secondary synchronous rectifier is higher than a predetermined value.

7. The isolated voltage converter in claim 4, wherein said primary controller detects said reflected primary peak current and changes said primary current peak value in the same direction.

8. The isolated voltage converter in claim 1, wherein when the output voltage is larger than an upper threshold, said secondary controller turns off said secondary synchronous rectifier until the output voltage is lower than a lower threshold.

9. The isolated voltage converter in claim 1, wherein said tail current peak value changes with the peak value of the source-drain voltage of said secondary synchronous rectifier in the same direction.

10. The isolated voltage converter in claim 1, wherein said secondary synchronous rectifier is connected in parallel with a capacitor.

11. The isolated voltage converter in claim 7, wherein said primary controller includes:
    a reference voltage generator, saving said reflected primary peak current and generating a reference voltage according to said reflected primary peak current in the same direction;
    a first comparator, with its inverting input connected to the output of said reference voltage generator and receiving sensed value of said primary current at its non-inverting input;
    a second comparator, receiving the drain voltage of said primary switch at its inverting input and receiving said reference primary turn-on trigger voltage at its non-inverting input; and
    an RS flip-latch, with the reset input connected to the output of said first comparator and the set input connected to the output of said second comparator, and putting out the primary gate control signal.

12. The isolated voltage converter in claim 6, wherein said secondary controller includes:
    a reference voltage generator, receiving the output voltage to generate the reference voltage in inverse to said output voltage;
    a first comparator, with its inverting input connected to the output of said reference voltage generator and receiving a voltage representing the reverse current of said secondary side circuit at its non-inverting input;
    a second comparator, receiving the source voltage of said secondary synchronous rectifier at its non-inverting input and receiving a reference voltage at its inverting input;
    an RS flip-latch, with its reset input connected to the output of said first comparator and its set input connected to the output of said second comparator and putting out the secondary gate control signal.

13. The isolated voltage converter in claim 12, wherein said reference voltage generator receives the output current to generate the reference voltage in the same direction.

14. The isolated voltage converter in claim 8, wherein said primary controller includes:
    a first comparator, receiving sensed value of said primary current at its non-inverting input and receiving a reference voltage at its inverting input;
    a second comparator, receiving the drain voltage of said primary switch at its inverting input and receiving said reference primary turn-on trigger voltage at its non-inverting input; and
    an RS flip-latch, with the reset input connected to the output of said first comparator and the set input connected to the output of said second comparator, and putting out the primary gate control signal.

15. The isolated voltage converter in claim 11, wherein said primary controller further includes one or more of the voltage detection circuit, current detection circuit, reference voltage generator and gate driving circuit.

16. The isolated voltage converter in claim 8, wherein said secondary controller includes:
    an output voltage detection circuit, receiving said output voltage and generating the output voltage signal in proportional to said output voltage;
    a first comparator, receiving said output voltage signal at its inverting input and receiving said lower threshold reference voltage at its non-inverting input;
    a second comparator, receiving said output voltage signal at its non-inverting input and receiving said upper threshold reference voltage at its inverting input;
    a third comparator, receiving a voltage proportional to the secondary negative current at its non-inverting input and receiving a reference voltage at its inverting input;
    a fourth comparator, receiving the source voltage of said secondary synchronous rectifier at its non-inverting input and receiving a reference voltage at its inverting input;
    a first RS flip-latch, with its reset input connected to the output of said first comparator and its set input connected to the output of said second comparator;
    a second RS flip-latch, with its set input connected to the output of said first comparator and its set input connected to the output of said first RS flip-latch;
    a third RS flip-latch, with its set input connected to the output of said second RS flip-latch and its reset input connected to the output of a fourth RS flip-latch;

a fourth RS flip-latch, with its set input connected to the output of said third comparator and its reset input connected to the output of said fourth comparator;

a fifth RS flip-latch, with its set input connected to the output of said fourth comparator and its reset input connected to the output of a first OR gate;

a first OR gate, with one input connected to the output of said first RS flip-latch and another input connected to the output of the fourth RS flip-latch;

a second OR gate, with one input connected to the output of said third RS flip-latch and another input connected to the output of a fifth RS flip-latch and putting out the secondary gate control signal.

17. The isolated voltage converter in claim 16, wherein said secondary controller further includes an NPN transistor with the base node connected to the output of said first RS flip-latch, the emitter node connected to the ground and the collector node connected to the output of said second OR gate.

18. The isolated voltage converter in claim 16, wherein an error amplifier is used to replace said output voltage detection circuit.

19. The isolated voltage converter in claim 12, wherein said secondary controller further includes one or more of current detection circuit, voltage detection circuit, reference voltage generator and gate driving circuit.

20. A secondary controller that controls the switching of the secondary synchronous rectifier of an isolated converter, the isolated converter supplying a load, and wherein the secondary controller controls said secondary synchronous rectifier to "on" after the secondary current decreases to zero to generate a negative tail current and turns "off" said secondary synchronous rectifier when said tail current reaches a reference tail current peak value, wherein said secondary controller increases said tail current peak value when the load increases and said secondary controller decreases said tail current peak value when the load decreases.

21. The secondary controller in claim 20 turning on said secondary synchronous rectifier when the secondary current reaches a predetermined value.

22. The secondary controller in claim 21 once detecting that the output voltage is larger than an upper threshold, turning off said secondary synchronous rectifier until the output voltage lower than a lower threshold is detected.

23. The secondary controller in claim 20 including:
an output voltage detection circuit, receiving said output voltage and generating the output voltage signal in proportional to said output voltage;
a first comparator, receiving said output voltage signal at its inverting input and receiving said lower threshold reference voltage at its non-inverting input;
a second comparator, receiving said output voltage signal at its non-inverting input and receiving said upper threshold reference voltage at its inverting input;
a third comparator, receiving a voltage proportional to the secondary negative current at its non-inverting input and receiving a reference voltage at its inverting input;
a fourth comparator, receiving the source voltage of said secondary synchronous rectifier at its non-inverting input and receiving a reference voltage at its inverting input;

a first RS flip-latch, with its reset input connected to the output of said first comparator and its set input connected to the output of said second comparator;

a second RS flip-latch, with its set input connected to the output of said first comparator and its set input connected to the output of said first RS flip-latch;

a third RS flip-latch, with its set input connected to the output of said second RS flip-latch and its reset input connected to the output of a fourth RS flip-latch;

a fourth RS flip-latch, with its set input connected to the output of said third comparator and its reset input connected to the output of said fourth comparator;

a fifth RS flip-latch, with its set input connected to the output of said fourth comparator and its reset input connected to the output of a first OR gate;

a first OR gate, with one input connected to the output of said first RS flip-latch and another input connected to the output of the fourth RS flip-latch;

a second OR gate, with one input connected to the output of said third RS flip-latch and another input connected to the output of a fifth RS flip-latch and putting out the secondary gate control signal.

24. The secondary controller in claim 23 further including an NPN transistor with the base node connected to the output of said first RS flip-latch, the emitter node connected to the ground and the collector node connected to the output of said second OR gate.

25. The secondary controller in claim 24, wherein an error amplifier is used to replace the output voltage detection circuit.

26. The secondary controller in claim 20 further including the secondary synchronous rectifier.

27. An isolated converter control method, including:
generating a negative tail current at the secondary side; and
turning off the secondary synchronous rectifier when said tail current reaches a reference tail current peak value to generate a negative current at the primary side for turning on the primary switch wherein said tail current peak value increases when the load of the isolated converter increases and said tail current peak value decreases when the load decreases.

28. The isolated converter control method in claim 27, wherein said negative current at the primary side discharges through a capacitor in parallel with said primary switch and turns on said primary switch when the drain voltage of said primary switch is pulled down to at or near zero.

29. The isolated converter control method in claim 28, wherein when the positive primary current reaches a reference primary current peak value, turning off said primary switch.

30. The isolated converter control method in claim 29, wherein said tail current peak value changes in the same direction with the load transition, and meanwhile, detects the reflected primary peak current and changes said primary current peak value in the same direction.

31. The isolated converter control method in claim 27, wherein when the output voltage is larger than an upper threshold, turns off said secondary synchronous rectifier until the output voltage is lower than a lower threshold.

* * * * *